United States Patent [19]

Shiraishi et al.

[11] Patent Number: 4,959,794
[45] Date of Patent: Sep. 25, 1990

[54] DRIVING WHEEL SLIP CONTROL DEVICE

[75] Inventors: Shuji Shiraishi; Hironobu Kiryu; Takashi Nishihara; Naoki Omomo; Makoto Sato, all of Wako, Japan

[73] Assignee: Honda Giken Kogyo Kabushiki Kaisha, Tokyo, Japan

[21] Appl. No.: 279,693

[22] Filed: Dec. 5, 1988

[30] Foreign Application Priority Data

Oct. 12, 1987 [JP] Japan ................. 62-314589

[51] Int. Cl.⁵ .............................................. B60K 31/00
[52] U.S. Cl. ................................. 364/426.03; 180/197
[58] Field of Search ............... 364/426.03, 426.01, 364/426.02; 180/197; 303/95

[56] References Cited

U.S. PATENT DOCUMENTS

| 4,739,856 | 4/1988 | Inagaki et al. | 180/197 |
| 4,762,196 | 8/1988 | Harada et al. | 180/197 |
| 4,763,262 | 8/1988 | Leiber | 364/426 |
| 4,778,025 | 10/1988 | Sakaguchi et al. | 180/197 |
| 4,779,202 | 10/1988 | Leiber | 364/426.03 |
| 4,788,644 | 11/1988 | Inagaki | 364/426.03 |
| 4,856,610 | 8/1989 | Leiber et al. | 180/197 |

Primary Examiner—Thomas G. Black
Attorney, Agent, or Firm—Armstrong, Nikaido, Marmelstein, Kubovcik & Murray

[57] ABSTRACT

A driving wheel slip control device has a prohibition determining device for determining a prohibition region in which an engine control operation such as fuel suspension or an ignition stop is carried out, and a prohibition device for prohibiting the engine control operation even if an excessive or abnormal slip is generated. Prevention of a resonance and an engine stall are realized in addition to an expansion of a slip control region.

7 Claims, 4 Drawing Sheets

DRIVING WHEEL SLIP CONTROL DEVICE

FIELD OF THE INVENTION

This invention relates to a driving wheel slip control device for a vehicle and more particularly to a control device which can prevent an engine stall.

BACKGROUND OF THE INVENTION

There has been a conventionally known a driving wheel slip control device in which, in order to prevent an excessive slip of a driving wheel, the state of slip is detected in response to the velocity of a driving wheel and the like. When a slip has occurred, for example, fuel supplied to an engine is stopped in order to suspend the combustion of the engine. Japanese Patent Laid-Open Publication 47-1512 discloses a slip control device in which suspension of combustion of an engine is prohibited when the engine is rotated at a low speed or when a vehicle runs at a low speed in order to prevent an engine stall.

However, in conventional slip control devices, a region in which the combustion of the engine is prohibited from stopping (this region is simply called "a prohibition region" hereinafter) is determined on the basis of either the number of revolutions of an engine or the velocity of the vehicle. Therefore, a defect occurs because (a) a suspension system resonates which decreases the driving ability of the vehicle and (b) slip control cannot be carried out over a wide region of revolutions of an engine while preventing an engine stall.

That is, in case the prohibition region is determined on the basis of only the number of revolutions of an engine, and a predetermined number of revolutions of an engine, as a threshold value, is determined at a minimum value to prevent engine stall, the cycle of combustion and the stopping of combustion of the engine will coincide with a specific frequency of the suspension system, when the vehicle is started or during low velocity of the vehicle. This generates a resonance of the suspension system which decreases the driving ability of th vehicle. Moreover, in case the predetermined number of revolutions of an engine is determined at a value higher than the minimum value in order to prevent such a resonance, the prohibition region is widened to include a region of middle velocity of the vehicle in a high gear position of a transmission gear. This will reduce the region where slip control is to be primarily performed which corresponds to an expansion of the prohibition region.

In contrast, in case the prohibition region is determined only on the basis of the velocity of the vehicle, the region of low engine revolution is excluded from the prohibition region in a high gear position of the transmission gear which makes it impossible to prevent an engine stall.

SUMMARY OF THE INVENTION

In order to solve the above problems of the prior art, the object of this invention is to provide a driving wheel slip control device in which the driving ability of the vehicle will be improved by preventing resonance in a suspension system, and which not only prevents an engine stall but also expands a slip control region.

According to this invention, a driving wheel slip control device comprises a driving wheel velocity sensor for detecting velocity of a driving wheel of a vehicle. A vehicle velocity sensor detects the velocity of the vehicle. An engine revolutional number sensor detects the number of revolutions of the engine. A slip detecting device detects a state of slip of the driving wheel in accordance with a output from the driving wheel velocity sensor. An engine output reducing device reduces an output of the engine in accordance with an output from the slip detecting device. A prohibition region determining device determines a control prohibition region in accordance with the velocity of the vehicle and the number of revolutions of the engine. A prohibition device prohibits the engine output reducing device from operating to reduce the engine output when the output from the vehicle velocity sensor or the output from the engine revolutional number sensor is in the control prohibition region.

The characteristic features and effects of the present invention will become apparent from the following detailed description when taken together with the drawings.

DESCRIPTION OF THE PREFERRED EMBODIMENT

One embodiment of this invention will now be explained with reference to the drawings.

Figure 1:
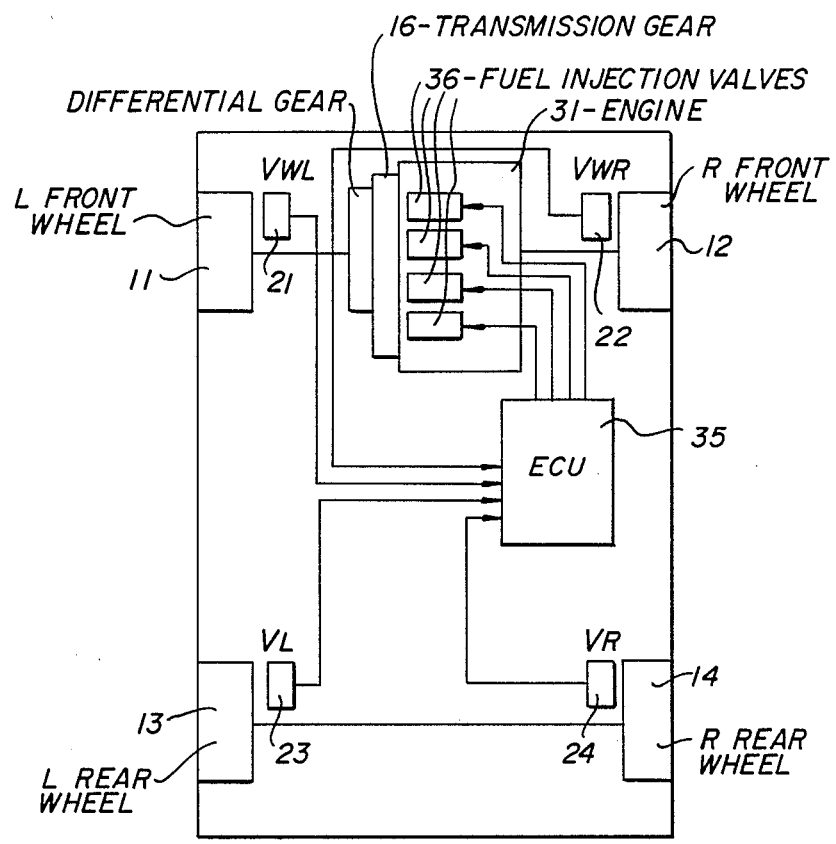
FIG. 1 is a constructional view of a driving wheel slip control device according to this invention.

FIG. 1 shows a vehicle 1 provided with a driving wheel slip control device. The vehicle 1 is, for example, a front wheel drive type vehicle. Two front wheels 11 12 function as two driving wheels driven by an internal combustion engine through a transmission gear 16 while two rear wheels 13, 14 function as two driven wheels, respectively. This invention can be used for a rear wheel drive type vehicle in the same manner as will be described for a front wheel driven vehicle. Two driving wheel velocity sensors 21, 22 (each called "$V_W$ sensor" hereinafter) are provided on the driving wheels 11, 12 and two driven wheel velocity (velocity of a vehicle) sensors 23, 24 (each called a "V sensor" hereinafter) are provided on the driven wheels 13, 14. Two left and right driving velocities VWL, VWR are detected by the "$V_W$ sensors" 21, 22 and left and right driven wheel velocities $V_L$, $V_R$ are detected by the "V sensors" 23, 24. These detected signals are input into an electric control unit 35 (called "ECU" hereinafter).

The ECU 35 forms a slip detecting means, an engine output reducing means, a prohibition region determining means and a prohibition means.

The ECU 35 selects either the left or right driving wheel velocity $V_{WL}$ or $V_{WR}$ as a driving wheel velocity $V_W$, and selects either the driven wheel velocity $V_L$ or $V_R$ (on the same side as the selected driving wheel velocity $V_{WL}$ or $V_{WR}$) as the vehicle velocity V.

The ECU 35 controls an output of an engine 31 through a fuel supply control device to adjust the torque of each of the driving wheels 11, 12 to control the state of slip of the driving wheels 11, 12.

Figure 2:
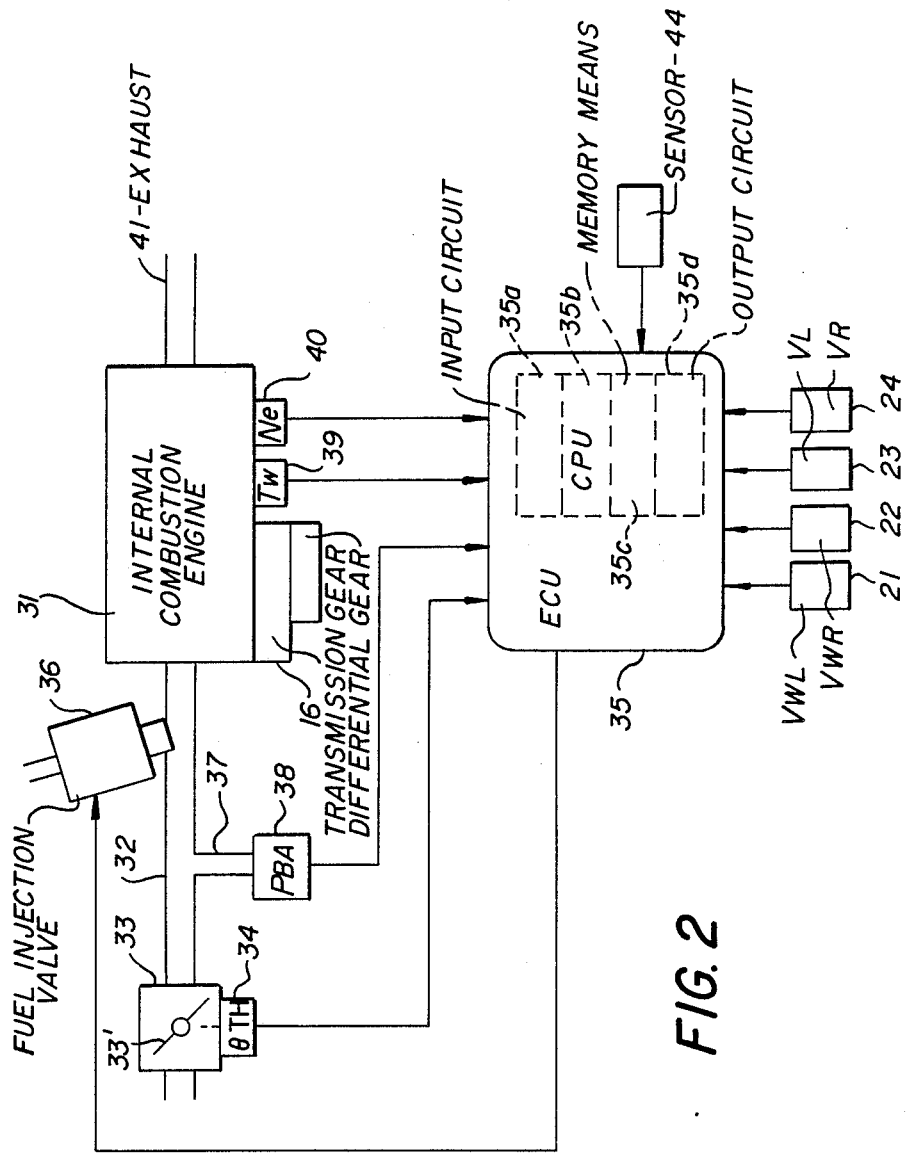
FIG. 2 is a constructional view of a fuel supply control device for controlling an output of an engine.

FIG. 2 shows a general construction of the fuel supply control device. The internal combustion engine 31 is provided with, for example, six cylinders, and an intake tube 32 is connected on the upstream side of the engine 31 while an exhaust tube 41 is connected on the downstream side of the engine. A throttle body 33 is provided at an intermediate portion of the intake tube 32. A throttle valve 33' is accommodated in the throttle body 33. The throttle valve 33' has a sensor 34 for detecting the opening degree of the valve ($\theta_{TH}$) which is converted into an electric signal to be sent to the ECU 35.

A fuel injection valve 36 is provided for each cylinder of the engine at an intermediate portion of the intake tube 32 between the engine 31 and the throttle body 33 at a slightly upstream portion of an intake valve (not shown) of each cylinder. The fuel injection valve 36 is connected to a fuel pump, which is not shown in the drawing, and is electrically connected to the ECU 35 so that a period of time that the valve 36 is opened can be controlled.

An intake tube absolute pressure ($P_{BA}$) sensor 38 is provided at a downstream position of the throttle body 33 of the intake tube 32 through a tube 37. An absolute pressure signal is converted by the absolute pressure sensor 38 into an electric signal and is input to the ECU 35.

The main body of the engine 31 has an engine cooling water temperature sensor 39 (called a "$T_W$ sensor" hereinafter). The $T_W$ sensor 39 is a thermistor, or the like, which is inserted into the peripheral wall of an engine cylinder to detect a cooling water temperature which is input to the ECU 35. An engine revolutional number sensor 40 (called a "Ne sensor" hereinafter) is fixed to a peripheral portion of a cam shaft or a crank-shaft (both not shown) of the engine. The Ne sensor 40 outputs crank angle position pulse signals (called a "TDC signal pulse" hereinafter) at predetermined positions of the crank-shaft each time the crank-shaft is rotated through an angle of 120 degrees. That is, the signals are output at predetermined crank angle positions before each piston reaches the top dead center (TDC) at a time when an intake step of each cylinder starts. Each TDC pulse signal is input to the ECU 35.

The $V_W$ sensors 21, 22, the V sensors 23, 24 and another parameter sensor 44 are connected to the ECU 35 to which each detected signal is input.

The ECU 35 shapes input signal waveforms input from each sensor to modify a voltage level to a predetermined level. The ECU 35 comprises an input circuit 35a which converts an analog signal value into a digital signal value, a central processing unit 35b (called a "CPU" hereinafter), a memory means 35c which stores various kinds of operational programs and calculated results, or the like, which are carried out by the CPU 35b, respectively, and an output circuit 35d which sends a driving signal to the fuel injection valve 36.

The CPU 35b calculates a fuel injection time of the fuel injection valve 36 in response to engine parameter signals from the various sensors each time the TDG pulse signal is input into the CPU 35b according to the following equation (1):

$$Tout = T_i \times K_1 + K_2 \quad (1)$$

where $T_i$ represents a basic period of time for fuel injection, (for example, the basic period of time $T_i$ is read from a $T_i$ map stored in the memory means 35c in accordance with the intake tube absolute pressure $P_{BA}$ and the engine revolutional number Ne) and where $K_1$ and $K_2$ represent a correction coefficient and a correction variable, respectively. $K_1$ and $K_2$ are predetermined values determined in such a manner that various characteristics, such as a characteristic of fuel consumption and a characteristic of acceleration in accordance with the driving state of the engine, become optimum.

The CPU 35b outputs a driving signal for opening the fuel injection valve 36 through the output circuit 35d based upon the time Tout calculated for fuel injection in the above-mentioned manner.

Figure 3:
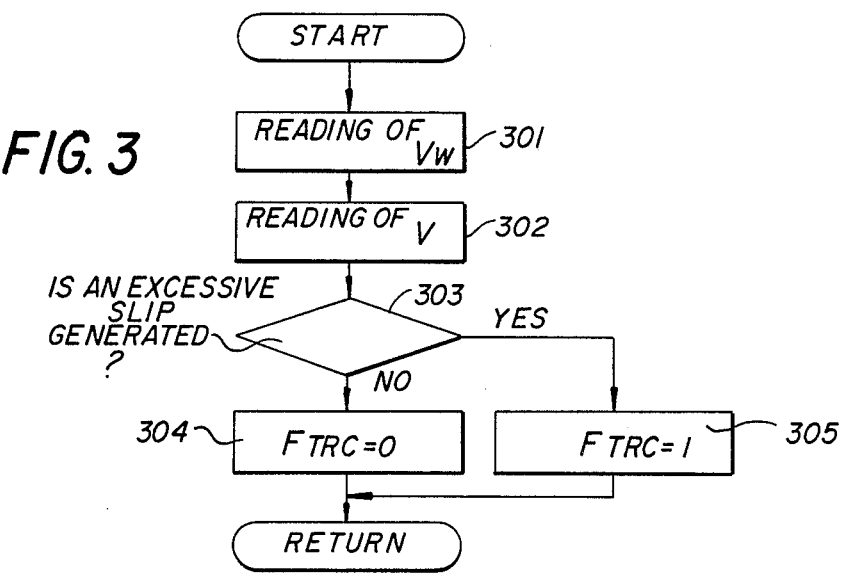
FIG. 3 is a flow chart of the subroutine for determining the state of an excessive slip of the driving wheels.

FIG. 3 shows a flow chart of a subroutine for determining whether or not an excessive or abnormal slip has occurred. This program is performed at a predetermined interval. First, the driving wheel velocity $V_W$ is read from the detected signals of the $V_W$ sensors 21, 22 (step 301), and then the vehicle speed V is read from the detected signals of the V sensors 23, 24 (step 302). Thereafter, a determination is made whether or not an excessive slip has been generated at the driving wheels 11, 12 (step 303). This determination can be performed in various ways. For example, the driving wheel velocity $V_W$ read in the step 302 can be compared with the reference velocity $V_R$ calculated based upon a predetermined expression in accordance with the vehicle velocity V read in the step 302, or a slip ratio $\lambda$ can be calculated based upon the driving wheel velocity $V_W$ and then the vehicle velocity V is compared with a reference slip ratio $\lambda$ R (e.g., 15%). When the determination of the step 303 is determined to be negative or "No", that is, when an excessive slip has not been generated at the driving wheels 11, 12, a flag $F_{TRC}$ is set to a value "0" (step 304). When the determination of the step 303 is determined to be affirmative or "Yes", that is, when an excessive slip has been generated, the flag $F_{TRC}$ is set to a value "1" and the program is then terminated.

Figure 4:
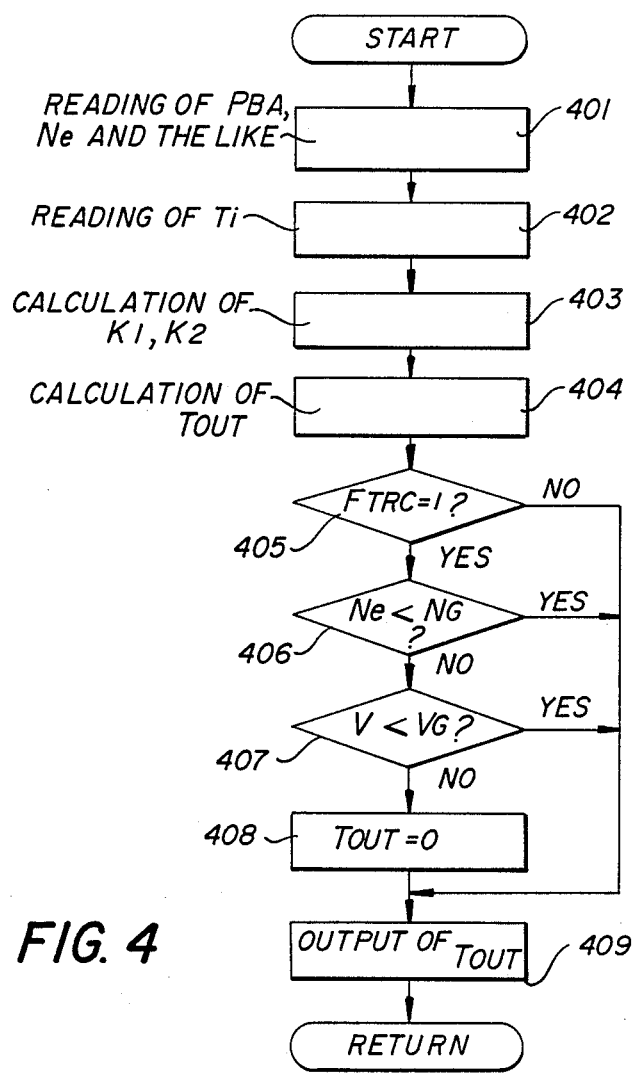
FIG. 4 is a flow chart of a subroutine for controlling the fuel supply to an engine and suspension of the fuel supply.

FIG. 4 shows a flow chart of a subroutine for controlling fuel supply and suspension thereof. This program is performed synchronously with the TDC pulse signal each time the TDC pulse signal is output. First, engine parameter signals, such as the intake tube absolute pressure $P_{BA}$, the engine revolutional number Ne, and the like, input from the various sensors, are read at step 401. Next, the basic fuel injection time $T_i$ of the fuel injection valve 36 is read in response to those engine parameter signals in the above manner (step 402). The correction coefficient $K_1$ and the correction variable $K_2$ are calculated (step 403). Thereafter, fuel injection time Tout is calculated based upon the calculated $T_i$, $K_1$ and $K_2$ values in accordance with the above equation (1) (step 404).

Next, a determination is made whether or not flag $F_{TRC}$ is a value "1" (step 405). When the determination is negative (No), that is, when the flag $F_{TRC}$ is "0", i.e., excessive slip has not been generated at the driving wheels 11, 12, a step 409 starts to output to the fuel injecting value 36 a driving signal based upon the fuel injection time Tout calculated at step 404. During the time Tout, fuel is supplied from the fuel injection valve 36 to the engine 31. The program then terminates.

Figure 5:
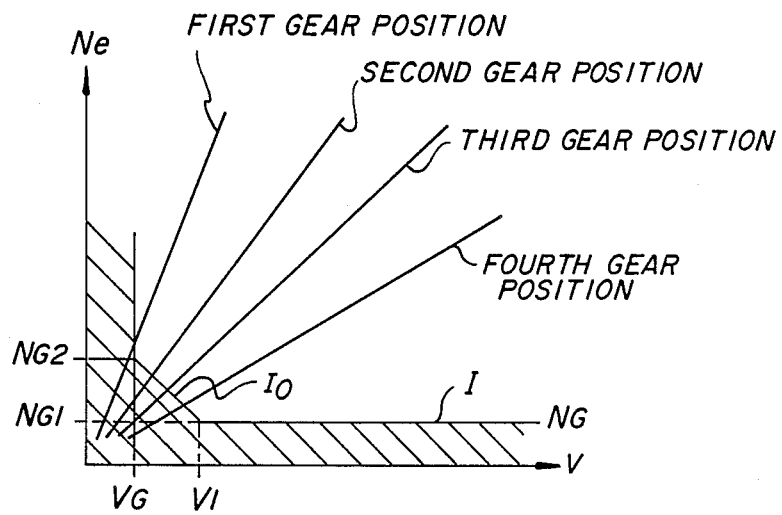
FIG. 5 is a view showing a prohibition region in which the fuel supply to the engine is suspended during an excessive slip.

When the determination of step 405 is affirmative (Yes), that is, when the flag $F_{TRC}$ is "1", i.e., excessive slip has been generated at the driving wheels 11, 12, the next steps 406, 407 determine whether or not the engine revolutional number Ne and the vehicle velocity V exist in region in which the fuel supply to the engine 31 is to be stopped (this is called a "fuel cut" hereinafter) in order to prevent a engine stall. FIG. 5 shows this region. In FIG. 5, four lines II to V show relationships between the engine revolutional number Ne and the vehicle speed V when a slip has not been generated in the case that the transmission gear 16 takes four first to fourth gear positions as a parameter.

First, in a step 406, a determination is made whether or not the engine revolutional number Ne is smaller than a predetermined revolutional number $N_G$. The predetermined revolutional number $N_G$ is determined based upon a solid line I in FIG. 5 in accordance with a vehicle velocity at that time. Namely, a reference velocity $V_1$ (e.g., 30 km/h) and a predetermined velocity $V_G$ (e.g., 4 km/h) smaller than the reference velocity $V_1$ are determined with respect to the vehicle velocity V. The predetermined revolutional number $N_G$ is respectively determined at a first value $N_{G1}$ (e.g., 1200 rpm) when the vehicle velocity V is larger than the reference velocity $V_1$ and at a second value (e.g., 2000 rpm) larger than the first value $N_{G1}$ when the vehicle velocity V is smaller than the predetermined velocity $V_G$, that is, when the vehicle 1 runs in a low vehicle velocity region. The predetermined revolutional number $N_G$ is determined by an interpolated calculated line $I_0$ when the vehicle velocity V is between the reference velocity $V_1$ and the predetermined velocity $V_G$. In this manner, the reason why the predetermined revolutional number $N_G$ is determined according to the vehicle velocity without referring to the driving wheel velocity $V_W$ is that an occurrence of an engine stall, due to a fuel-cut, depends upon the kinetic energy of a vehicle. The amount of kinetic energy is more accurately reflected by the level of the vehicle velocity V than by other elements.

When the determination of step 406 is negative (No), that is, when the relationship between Ne and $N_G$ is Ne≧$N_G$, a determination is and whether or not the vehicle speed V is smaller than the predetermined vehicle velocity $V_G$ (step 407). When the determination is negative (No), that is, when the relationship between V and $V_G$ is V≧$V_G$, the fuel injection time Tout is determined to be a value "0" (step 408). The time Tout is output (step 409) and the execution of the program is terminated. That is, when an excessive slip has been generated at the driving wheels 11, 12, the relationship between Ne and $N_G$ is Ne≧$N_G$, and the relationship between V and $V_G$ is V≧$V_G$ (a region outside the region indicated by the oblique lines), the fuel supply t the engine is suspended to reduce the output of the engine, so that an excessive slip of the driving wheels can be prevented.

When the determination of either step 406 or 407 is affirmative (Yes), step 409 outputs Tout and the execution of the program is terminated. That is, even if an excessive slip has been generated at the driving wheels 11, 12, i.e., if the relationship between Ne and $N_G$ is Ne<$N_G$ when V>$V_1$, or if the relationship between V and $V_G$ is V<$V_G$ or if V and Ne are inside of the interpolated line $I_0$ when $V_G$<V<$V_1$ (a region indicated by oblique lines), the suspension of fuel to the engine is prohibited. Thus, the engine is supplied with fuel in accordance with the fuel injection time Tout calculated in step 404 which is based upon the driving state of the engine 31.

Since fuel-cut (or fuel suspension) region and a fuel cut prohibition (or fuel supplied) region are determined respectively at a time when an excessive slip has been generated at the driving wheels 11, 12, when the vehicle runs in a low vehicle velocity condition in which an engine stall is likely to occur, that is, the relationship between V and $V_G$ is V<$V_G$, the fuel-cut or the fuel suspension is prohibited, so that the engine stall can be effectively prevented at that time. When the vehicle 1 runs in a low vehicle velocity condition, and the predetermined revolutional number $N_G$ is determined to be a large value in the above manner, accordingly, the resonance phenomenon of the suspension system can be prevented. In addition, the suspension of fuel to the engine is prohibited when the transmission gear is in a high gear shift position such as a third or fourth gear shift position, etc. This fuel cut prohibition region can occur at a larger engine revolution than a fuel-cut prohibition region only determined according to the vehicle velocity V (see FIG. 5). Accordingly, an occurrence of an engine stall can be reliably prevented.

The possibility of the occurrence of an engine stall due to fuel suspension is rather low in intermediate and high velocity conditions of the vehicle. Accordingly, even if the predetermined revolutional number $N_G$ is determined to be a smaller value than mentioned above, the engine stall will not be caused by the determination. Such a determination expands a fuel suspension region, namely, a slip control region, thereby to prevent an excessive slip in the region.

The output of the engine is decreased by suspension of the fuel supply to the engine in this embodiment. However, the method of decreasing the output of the engine may be a method in which ignition is stopped in addition to the above method.

As mentioned above, a driving wheel slip control device according to this invention comprises a prohibition region determining means for determining a control prohibition region based upon the velocity of a vehicle and number of revolutions of an engine, and a prohibition means for prohibiting an engine output reducing means from operating to reduce an output of the engine in response to the output from a slip detecting means for detecting the state of slip of the driving wheels. Thus, a resonance phenomenon in a suspension system can be prevented to improve driving ability. Also, an engine stall can be prevented and the slip control region can be expanded.

It will be understood that the present invention may be embodied in other specific forms without departing from the spirit or essential characteristics thereof. The present embodiment is therefore to be considered in all respects as illustrative and not restrictive. The scope of the invention is indicted by the appended claims rather than by the foregoing description.

What we claim is:

1. A driving wheel slip control device comprising:
    a driving wheel velocity sensor means for detecting velocity of a driving wheel of a vehicle;
    a vehicle velocity means for detecting velocity of the vehicle;
    an engine revolutional number sensor means for detecting number of revolutions of an engine of the vehicle;
    a slip detecting means, connected to said driving wheel velocity sensor means, for detecting a state of slip of the driving wheel according to an output from said driving wheel velocity sensor means;

an engine output reducing means, connected to said slip detecting means, for reducing an output of the engine in accordance with an output from said slip detecting means;

a prohibition region determining means, connected to said vehicle velocity sensor means and said engine revolution number sensor means, for determining a control prohibition region in accordance with velocity of the vehicle and number of revolutions of the engine; and a prohibition means, connected to said engine output reducing mean and said prohibition region determining means, for prohibiting said engine output reducing means from operating to reduce an output of the engine when an output from said vehicle velocity sensor or engine revolutional number sensor is in said control prohibition region.

2. A driving wheel slip control device according to claim 1, wherein said slip detecting means detects a state of slip of the driving wheel by comparing a velocity of the driving wheel with a reference velocity calculated based upon a predetermined expression according to a velocity of the vehicle.

3. A driving wheel slip control device according to claim 1, wherein said slip detecting means detects a state of slip of the driving wheel by comparing a slip ratio calculated based upon a velocity of the driving wheel and a velocity of the vehicle with a reference slip ratio.

4. A driving wheel slip control device according to claim 1, wherein said prohibition region determining means has a predetermined engine revolutional number determining means for determining an engine revolutional number with respect to a velocity of the vehicle the predetermined engine revolutional number determining means determining an engine revolutional number with respect to a velocity of the vehicle by determining a reference vehicle velocity and a predetermined vehicle velocity, lower than the reference vehicle velocity, by determining a first value when a velocity of the vehicle is higher than the reference vehicle velocity, by determining a second value higher than the first value when a velocity of the vehicle is lower than the predetermined vehicle velocity and by determining a value based upon an interpolation calculation region when a velocity of the vehicle is between the reference vehicle velocity and th predetermined vehicle velocity, said prohibition region determining means determining a control prohibition region based upon engine revolutional numbers determined by the predetermined engine revolutional number determining means.

5. A driving wheel slip control device according to claim 4, wherein said control prohibition region determined by said prohibition region determining means comprises a region between a value and the first value with respect to engine revolutional number when a velocity of the vehicle is higher than the reference vehicle value, a region between a value 0 and the predetermined vehicle velocity with respect to a velocity of the vehicle when a velocity of the vehicle is lower than the predetermined vehicle velocity, and a region located inside the interpolation calculation region when a velocity of the vehicle is between the reference vehicle value and the predetermined vehicle velocity.

6. A driving wheel slip control device according to claim 1, wherein said prohibition means suspends fuel supply to the engine in a state where excessive slip is generated when a velocity of the vehicle and an engine revolutional number are not in said control prohibition region, and allows fuel to be supplied to the engine when excessive slip is generated if a velocity of the vehicle and an engine revolutional number are in said control prohibition region.

7. A driving wheel slip control device according to claim 1, wherein said prohibition means performs an ignition stop operation in a state where excessive slip is generated when a velocity of the vehicle and an engine revolutional number are not in said control prohibition region, and prohibits said ignition stop operation when excessive slip is generated if a velocity of the vehicle and an engine revolutional number are in said control prohibition region.

* * * * *

UNITED STATES PATENT AND TRADEMARK OFFICE
CERTIFICATE OF CORRECTION

PATENT NO. : 4,959,794

DATED : September 25, 1990

INVENTOR(S) : SHIRAISHI et al

It is certified that error appears in the above-identified patent and that said Letters Patent is hereby corrected as shown below:

On the cover page, Item [30], "Oct. 12, 1987" should read --Dec. 10, 1987--.

Signed and Sealed this

Tenth Day of December, 1991

*Attest:*

HARRY F. MANBECK, JR.

*Attesting Officer*      *Commissioner of Patents and Trademarks*